United States Patent
Li et al.

(10) Patent No.: US 11,402,480 B2
(45) Date of Patent: Aug. 2, 2022

(54) METHOD AND APPARATUS FOR OBSTACLE DETECTION

(71) Applicant: Telefonaktiebolaget LM Ericsson (publ), Stockholm (SE)

(72) Inventors: Ming Li, Beijing (CN); Bo Göransson, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 201 days.

(21) Appl. No.: 16/753,420

(22) PCT Filed: Nov. 6, 2017

(86) PCT No.: PCT/CN2017/109487
§ 371 (c)(1),
(2) Date: Apr. 3, 2020

(87) PCT Pub. No.: WO2019/084946
PCT Pub. Date: May 9, 2019

(65) Prior Publication Data
US 2020/0249339 A1   Aug. 6, 2020

(51) Int. Cl.
*G01S 13/32*   (2006.01)

(52) U.S. Cl.
CPC .................. *G01S 13/325* (2013.01)

(58) Field of Classification Search
None
See application file for complete search history.

(56) References Cited

U.S. PATENT DOCUMENTS

| | | |
|---|---|---|
| 2001/0052871 A1 | 12/2001 | Fukae et al. |
| 2004/0185873 A1 | 9/2004 | Gilkes et al. |
| 2011/0176499 A1 | 7/2011 | Siomina et al. |
| 2012/0213109 A1 | 8/2012 | Xu et al. |
| 2015/0085833 A1 | 3/2015 | Han et al. |
| 2018/0341000 A1* | 11/2018 | Cohen ................. G01S 7/003 |

FOREIGN PATENT DOCUMENTS

| | | |
|---|---|---|
| CN | 103392299 A | 11/2013 |
| CN | 104303439 A | 1/2015 |
| EP | 1566656 A2 | 8/2005 |
| JP | 2003057326 A | 2/2003 |
| WO | 2017180194 A1 | 10/2017 |

OTHER PUBLICATIONS

International Search Report and Written Opinion of the International Searching Authority for International Application No. PCT/CN2017/109487, dated Aug. 1, 2018, 8 pages.
Examination Report dated Nov. 12, 2021 for Indian Application No. 202047018955, 5 pages.
Extended European Search Report dated Oct. 20, 2020 for European Patent Application No. 17930752.5, 7 pages.

\* cited by examiner

*Primary Examiner* — Whitney Moore
(74) *Attorney, Agent, or Firm* — Christopher & Weisberg, P.A.

(57) ABSTRACT

Embodiments of the present disclosure provide a method, apparatus and computer program product for obstacle detection. A method implemented at a base station includes transmitting a positioning reference signal; receiving a transmission leakage signal and a reflection signal of the positioning reference signal; determining whether there exists an obstacle based on the reflection signal; and determining position information of the obstacle based on the transmission leakage signal and the reflection signal.

9 Claims, 12 Drawing Sheets

METHOD AND APPARATUS FOR OBSTACLE DETECTION

CROSS REFERENCE TO RELATED APPLICATIONS

This application is a 35 U.S.C. § 371 national stage application of PCT International Application No. PCT/CN2017/109487 filed on Nov. 6, 2017, the disclosure and content of which is incorporated by reference herein in its entirety.

TECHNICAL FIELD

The non-limiting and exemplary embodiments of the present disclosure generally relate to the technical field of wireless communications, and specifically to a method, apparatus and computer program product for obstacle detection.

BACKGROUND

This section introduces aspects that may facilitate a better understanding of the disclosure. Accordingly, the statements of this section are to be read in this light and are not to be understood as admissions about what is in the prior art or what is not in the prior art.

In real site implementation of a base station, site physical situation may impact antenna performance of the base station. Normally, before the site implementation, drive test and other tests are needed for network evaluation and network optimization. But after the site implementation, an obstacle, such as tree branch, outdoor billboard, new building, etc. could gradually appear and increase, which will impact the performance of the base station. Especially, when the obstacles are close to the antenna of the base station, the impact is more critical.

Therefore obstacle detection is needed to detect degradation of the antenna performance due to factors external to the base station, for example, the obstacle blocking the antenna.

A conventional approach for the obstacle detection is to utilize a MFSK (Multiple Frequency Shift Keying) signal. FIG. 1 shows a diagram illustrating a waveform of the MFSK signal. The MFSK waveform may consist of two interleaved stepped-frequency sequences. As shown in FIG. 1, the MFSK waveform is a combination of two linear FMCW (Frequency Modulated Continuous Wave) waveforms with a fixed frequency offset. Unlike the regular FMCW waveforms, MFSK signal sweeps the entire bandwidth at discrete steps. Within each step, a single frequency continuous wave signal is transmitted. Because there are two tones within each step, it can be considered as a frequency shift keying (FSK) waveform. Thus, there is one set of range and Doppler relation from the FMCW waveform and another set of range and Doppler relation from the FSK waveform. Combining two sets of relations together can help resolve the coupling between range and Doppler regardless the number of targets present in the scene.

Each sequence is a set of continuous waveform (CW) signals increasing in frequency. The offset Foffset between the two sequences is constant and may be positive or negative. A complete waveform may consist of an even number of steps N of equal duration Tstep. Then, each sequence may consist of N/2 steps. The sweep frequency Fsweep is a difference between the lowest and highest frequencies of either sequence. Fsweep is always positive, indicating increasing frequency. The frequency difference between the successive steps of each sequence may be given by Fstep=Fsweep/(N/2−1).

The lowest frequency of the first sequence is always 0 Hz and corresponds to the carrier frequency of a bandpass signal. The lowest frequency of the second sequence may be positive or negative and is equal to Foffset. The negative frequency corresponds to a bandpass frequency lower than the carrier frequency. The duration of the MFSK waveform may be given by Tsweep=N*Tstep.

In a conventional radar system, the MFSK signal is transmitted and received when reflected by a target. A range to the target and a velocity of the target may be determined based on a frequency difference and time delay between the transmitted and received MFSK signal. FIG. 2 illustrates a typical FMCW/MFSK radar transceiver of a radar system. In the receiving branch, the mixer uses the transmitted MFSK signal as a local oscillator signal to mix with the received MFSK signal.

Currently massive multiple-input multiple-output (MIMO) is one of key technologies in the LTE network. Massive MIMO makes use of a very large number of antennas that are operated fully coherently and adaptively in the base station to improve communication quality. Extra antennas help focusing transmission and reception of signal energy in ever-smaller regions of space. This may bring huge improvements in communication throughput and energy efficiency, in particularly when combined with simultaneous scheduling of a large number of terminal devices, e.g., tens or hundreds. Massive MIMO was originally envisioned for time division duplex (TDD) operation, but can also be potentially applied in frequency division duplex (FDD) operation. For the MIMO base station, the obstacle close to the base station may also impact performance of some antennas.

Some approaches are provided to detect the antenna performance degradation of the base station. One is manual on-site verification, which may result in high man-hour cost and on-site fee. The other is to utilize minimization of drive tests. However it needs additional feature of user equipment (UE), and focuses on UE side. So it cannot directly indicate the close range of the antenna and cannot distinguish the antenna performance problem or UE environment problem. In addition, the base station may be integrated with additional detection module mounted with infrared/optical/MMW radar realization. But it needs additional cost and hard for the integration.

SUMMARY

Various embodiments of the present disclosure mainly aim at providing a method, apparatus and computer program product for obstacle detection. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method implemented at a base station. In the method, a positioning reference signal is transmitted. A transmission leakage signal and a reflection signal of the positioning reference signal are received. Then it is determined whether there exists an obstacle based on the reflection signal, and position information of the obstacle is determined based on the transmission leakage signal and the reflection signal.

In some embodiments, the determination as to whether there exists an obstacle comprises: measuring a power level of the reflection signal; comparing the power level with a predefined threshold; and determining, in response to the power level being higher than the predefined threshold, that there exists the obstacle. In an embodiment, it is determined there exists no obstacle in response to the power level being lower than the predefined threshold.

In some embodiments, the determination of the position information of the obstacle comprises: determining a receipt time difference between the transmission leakage signal and the reflection signal; calculating a distance between the base station and the obstacle based on the receipt time difference; and estimating a direction of arrival of the reflection signal.

In a second aspect of the disclosure, there is provided an apparatus in a base station. The apparatus may comprise a processor and a memory coupled to the processor. The memory may contain instructions executable by the processor, whereby the apparatus is operative to: transmit a positioning reference signal, receive a transmission leakage signal and a reflection signal of the positioning reference signal, determine whether there exists an obstacle based on the reflection signal, and determine position information of the obstacle based on the transmission leakage signal and the reflection signal.

In some embodiments, the apparatus is operative to: measure a power level of the reflection signal, compare the power level with a predefined threshold, and determine, in response to the power level being higher than the predefined threshold, that there exists the obstacle. In an embodiment, the apparatus is operative to determine there exists no obstacle in response to the power level being lower than the predefined threshold.

In some embodiment, the apparatus is operative to: determine a receipt time difference between the transmission leakage signal and the reflection signal, calculate a distance between the base station and the obstacle based on the receipt time difference, and estimate a direction of arrival of the reflection signal.

In a third aspect of the disclosure, there is provided a base station. The base station may comprise a plurality of transceivers configured to transmit a positioning reference signal, and receive a transmission leakage signal and a reflection signal of the positioning reference signal, and a processing circuitry configured to determine whether there exists an obstacle based on the reflection signal, and determine position information of the obstacle based on the transmission leakage signal and the reflection signal.

In a fourth aspect of the disclosure, there is provided a computer program product being tangibly stored on a computer readable storage medium and including instructions which, when executed on at least one processor, cause the at least one processor to carry out the method according to the first aspect of the disclosure.

In a fifth aspect of the disclosure, there is provided a communication system. The communication system may comprise a host computer, the host computer including processing circuitry configured to provide user data and a communication interface configured to forward the user data to a cellular network for transmission to a terminal device. The cellular network may comprise a base station having a radio interface and processing circuitry. The base station's processing circuitry may be configured to perform any of the steps of the method according to the first aspect of the disclosure.

In a sixth aspect of the disclosure, there is provided a method implemented in a communication system comprising a host computer, a base station and a terminal device. The method may comprise: at the host computer, providing user data; and at the host computer, initiating a transmission carrying the user data to the terminal device via a cellular network comprising the base station. The base station may perform any of the steps of the method according to the first aspect of the disclosure.

In a seventh aspect of the present disclosure, there is provided a communication system. The communication system may comprise a host computer, the host computer including a communication interface configured to receive user data originating from a transmission from a terminal device to a base station. The base station may comprise a radio interface and processing circuitry. The base station's processing circuitry may be configured to perform any of the steps of the method according to the first aspect of the disclosure.

In an eighth aspect of the present disclosure, there is provided a method implemented in a communication system comprising a host computer, a base station and a terminal device. The method may comprise: at the host computer, receiving, from the base station, user data originating from a transmission which the base station has received from the terminal device, wherein the base station performs any of the steps of the method according to the first aspect of the disclosure.

According to the various aspects and embodiments as mentioned above, the obstacle detection can be implemented by the base station utilizing the positioning reference signal, without using additional obstacle detection device, and thus the antenna performance can be optimized.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
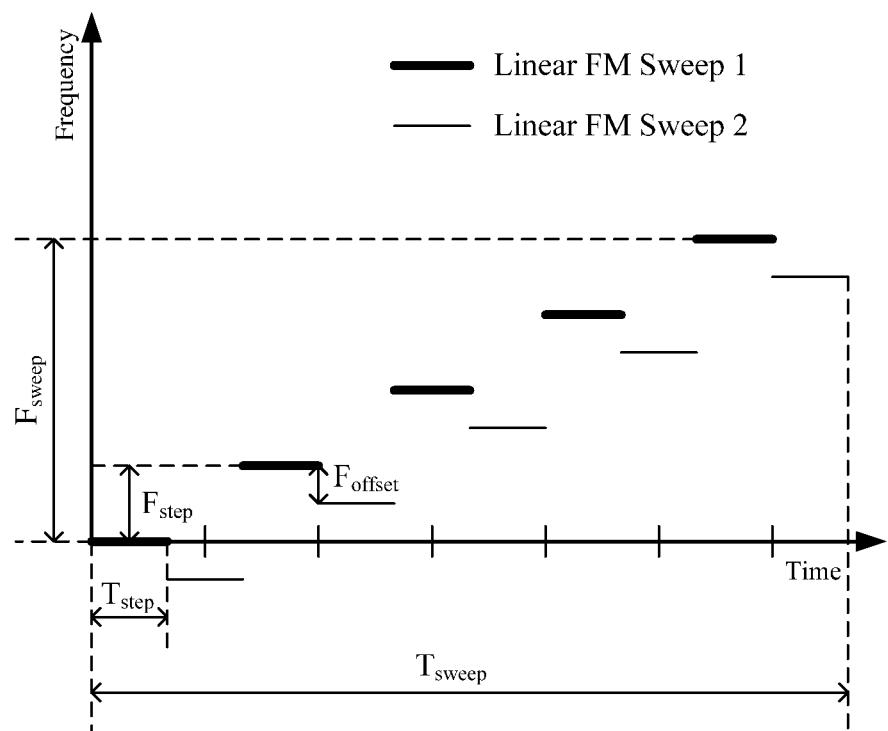
FIG. 1 shows a diagram illustrating a waveform of a MFSK signal.
Figure 2:
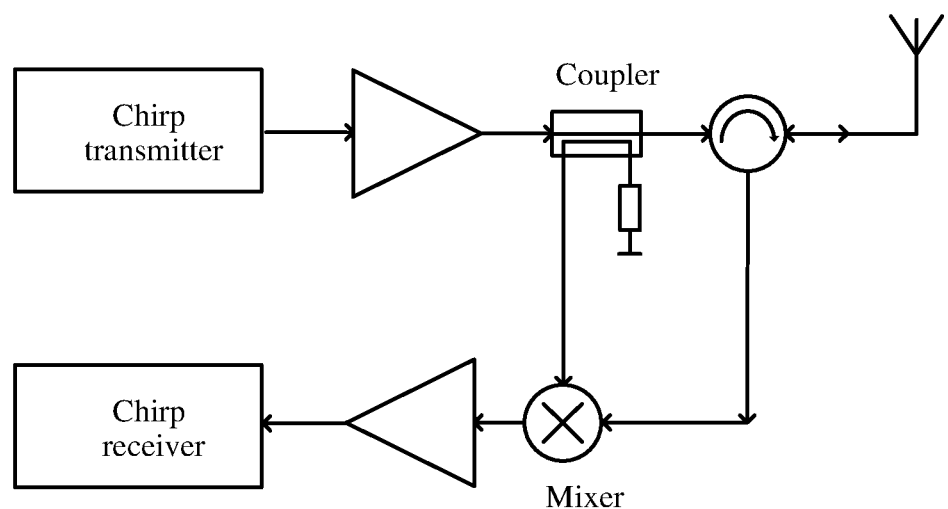
FIG. 2 illustrate a typical FMCW/MFSK radar transceiver.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "terminal device" used herein may refer to any terminal device or user equipment (UE) having wireless communication capabilities, including but not limited to, mobile phones, cellular phones, smart phones, or personal digital assistants (PDAs), portable computers, image capture devices such as digital cameras, gaming devices, music storage and playback appliances, wearable devices, vehicle-mounted wireless device and the like. In the following description, the terms "terminal device", "user equipment" and "UE" may be used interchangeably. Similarly, the term "base station" may represent a base station (BS), a node B (NodeB or NB), an evolved NodeB (eNodeB or eNB), a gNodeB, a Remote Radio Unit (RRU), a radio head (RH), a remote radio head (RRH), a relay node (RN), a low power node (LPN) such as a femto, a pico, an access point (AP) and so forth.

For illustrative purposes, several embodiments of the present disclosure will be described in the context of a 3GPP LTE system. Those skilled in the art will appreciate, however, that the concept and principle of the several embodiments of the present disclosure may be more generally applicable to other wireless networks, for example a third generation (3G) CDMA-based network or a future network (e.g., a 5G or New Radio (NR) system).

The non-limiting and exemplary embodiments of the present disclosure relate to the obstacle detection implemented in the base station. In the obstacle detection, the PRS in the LTE system is utilized which acts as the FMSK signal in the radar system.

Positioning reference signal (PRS) has been introduced in 3GPP LTE release 9 standard to allow proper timing/ranging measurements of a UE from BS signals to improve OTDOA (Observed Time Difference of Arrival) position performance PRS has some similarities with cell-specific reference signals as defined in LTE release 8. PRS is a pseudo-random QPSK (Quadrature Phase Shift Keying) sequence that is being mapped in diagonal pattern switch shifts in frequency and time to avoid collision with cell-specific reference signals and an overlap with the control channels (e.g. Physical Downlink Control Channel, PDCCH). PRS is transmitted on antenna port 6, and defined for 15 KHz sub-carrier offset only.

Figure 3:
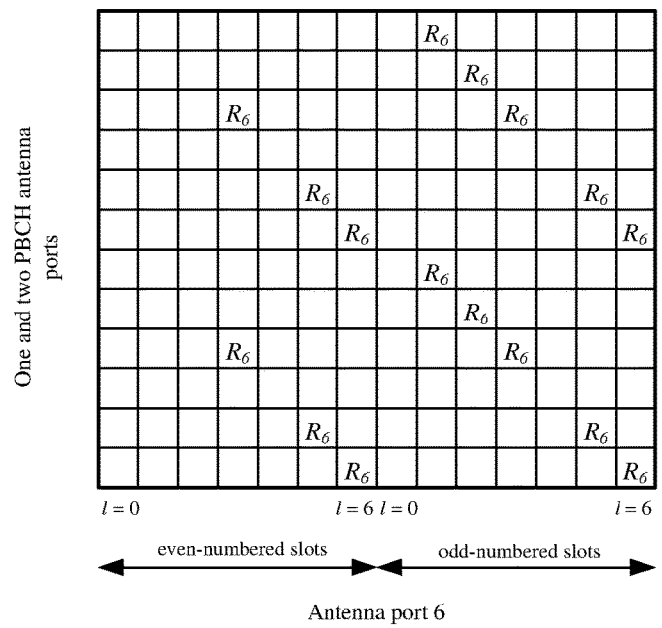
FIG. 3 illustrates a mapping of the PRS in a resource block.
Figure 4:
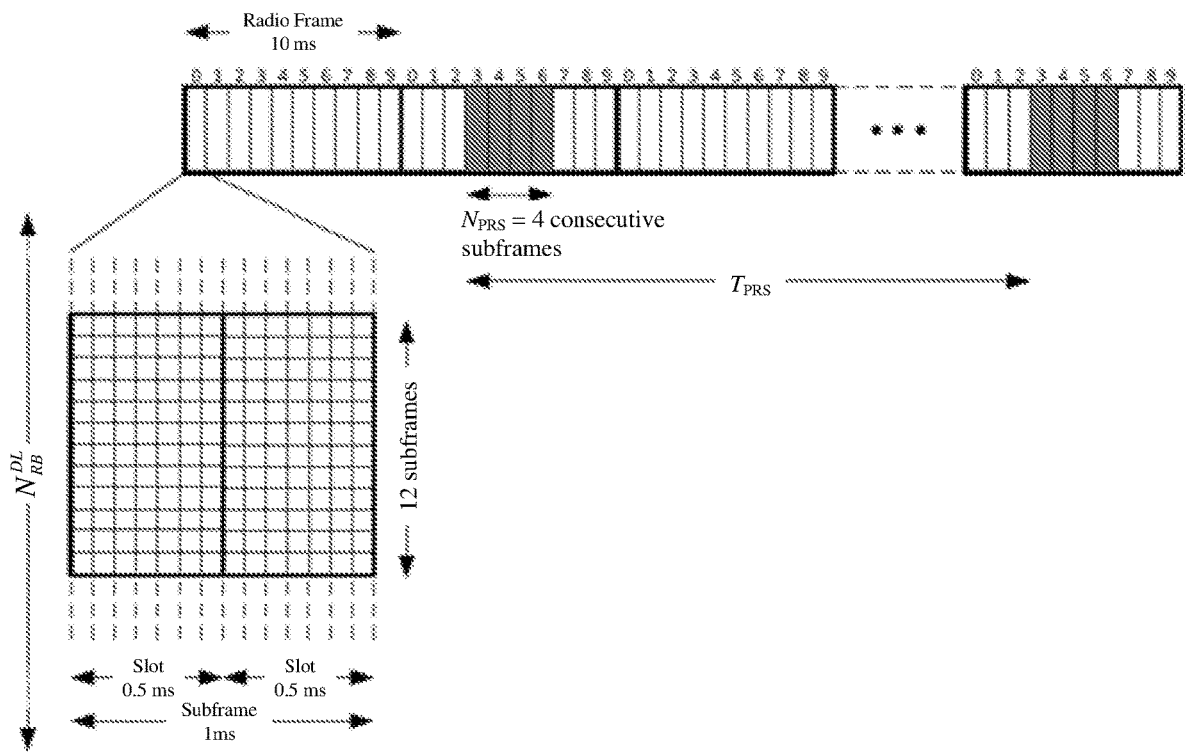
FIG. 4 illustrates an exemplary PRS transmission schedule.
Figure 5:
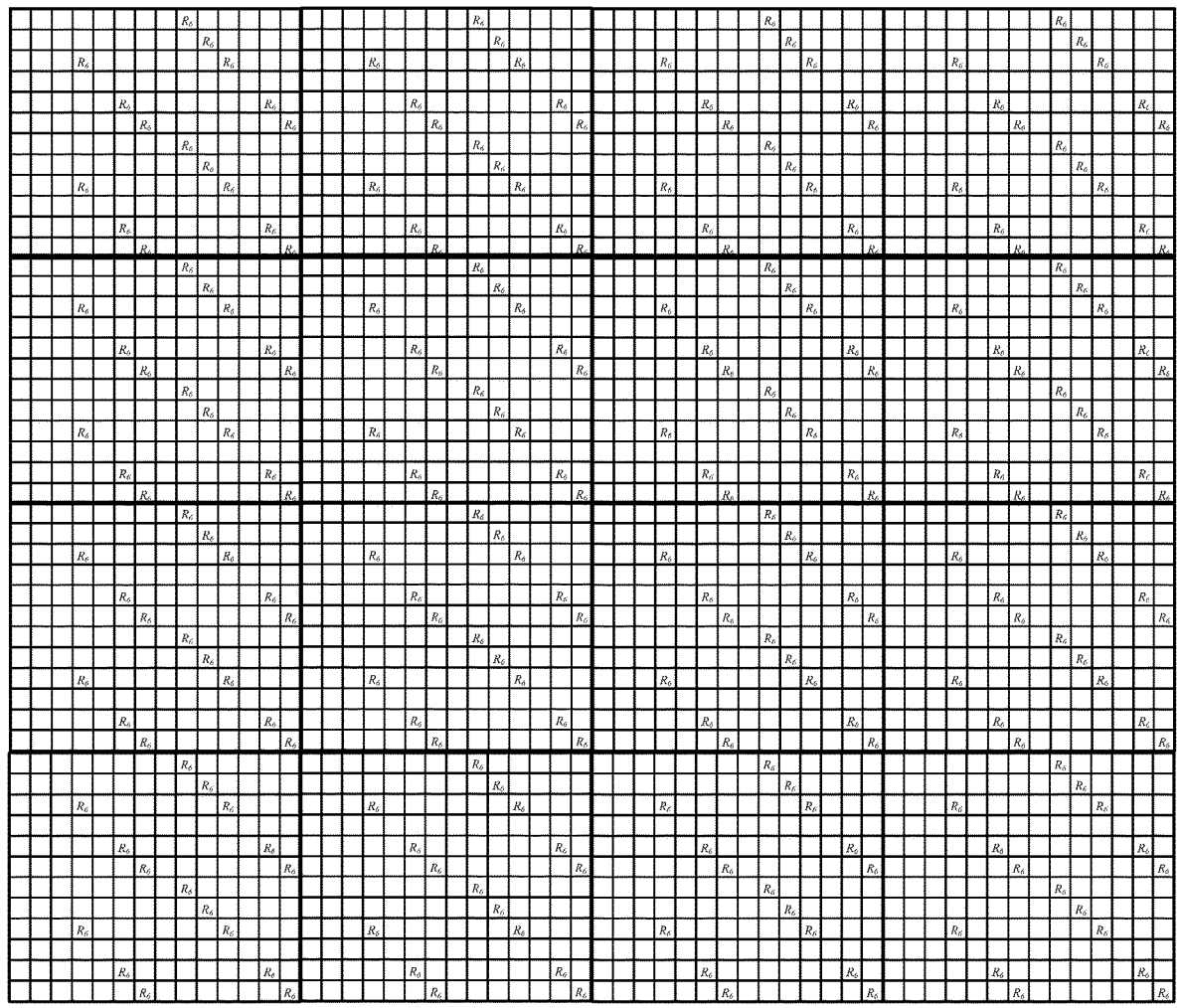
FIG. 5 illustrates an example of a PRS pattern.

FIG. 3 illustrates a mapping of the PRS in a resource block. The squares R6 indicate resource elements within the resource block of 12 subcarriers over 14 OFDM (Orthogonal Frequency Division Multiplexing) symbols, respectively. The PRS is only transmitted in the resource blocks of consecutive downlink subframes configured for the PRS transmission, e.g. 1, 2, 4 or 6 subframes. FIG. 4 illustrates an exemplary PRS transmission schedule using 4 consecutive subframes. FIG. 5 illustrates an example of a PRS pattern in 4 consecutive subframes. As shown in FIG. 5, the PRS pattern may indicate multiple MFSK signals.

Figure 6:
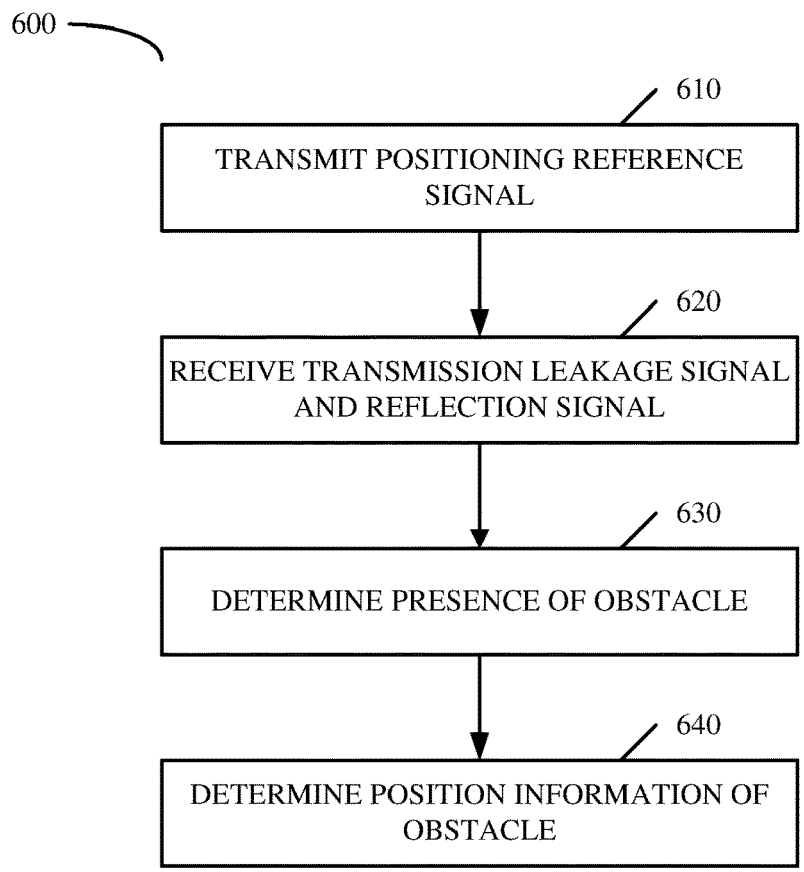
FIG. 6 illustrates a flowchart of a method implemented at a base station according to an embodiment of the present disclosure.

FIG. 6 illustrates a flowchart of a method 600 implemented at a base station according to an embodiment of the present disclosure. The base station may be, for example, a NB, an eNB or a gNB with multi-antenna structure.

As shown in FIG. 6, at block 610, the base station may transmit a PRS. In an embodiment, the PRS may be transmitted through one or more transceivers in the base station.

The PRS may be generated in base band and modulated to a certain carrier frequency for transmission. In the case of transmission via multiple transmitters, the PRS may be transmitted in different directions.

At block 620, the base station may receive a transmission leakage signal and a reflection signal of the PRS. In an embodiment, the signals may be received via one or more other transceivers in the base station. Normally when the base station transmits a carrier signal, the carrier signal may also be leaked from the transmitter to the receiver. Therefore when the PRS is transmitted, the PRS will also be leaked to the receiver. Such the leaked signal may be referred to as "transmission leakage signal" hereinafter. On the other hand, if there is the obstacle close to the base station, the transmitted PRS may be reflected by the obstacle. The reflected PRS (hereinafter also referred to as "reflection signal") may be received by the base station. The transmission leakage signal and the reflection signal may be distinguished according to their receipt times. Usually, the receipt time of the transmission leakage signal is earlier than the reflection signal.

Then at block 630, the base station may determine whether there exists an obstacle based on the received reflection signal. In an embodiment, the base station may measure a power level of the reflection signal, and compare the power level with a predefined threshold. If the power level is higher than the predefined threshold, it is determined that there exists the obstacle. If the power level is lower than the predefined threshold, it is determined that no obstacle exists. A person skilled in the art will appreciate that other performance parameters of the reflection signal may be utilized to determine the presence of the obstacle.

If there is no obstacle, the method ends. If there is the obstacle, at block 640, the base station may determine position information of the obstacle based on the transmission leakage signal and the reflection signal. In an embodiment, the base station may determine a receipt time difference between the transmission leakage signal and the reflection signal. Then a distance between the base station and the obstacle may be determined according to the receipt time difference. Further, the base station may calculate a direction of arrival (DOA) of the reflection signal. The DOA calculation may be achieved by typical DOA algorithm which is known to a person skilled in the art. The DOA may indicate the direction of the obstacle. Accordingly the position information (e.g. the distance, the direction) of the obstacle can be determined.

With the method as shown in FIG. 6, the base station can implement the obstacle detection, without other specific obstacle detection device such as the radar system.

Figure 7:
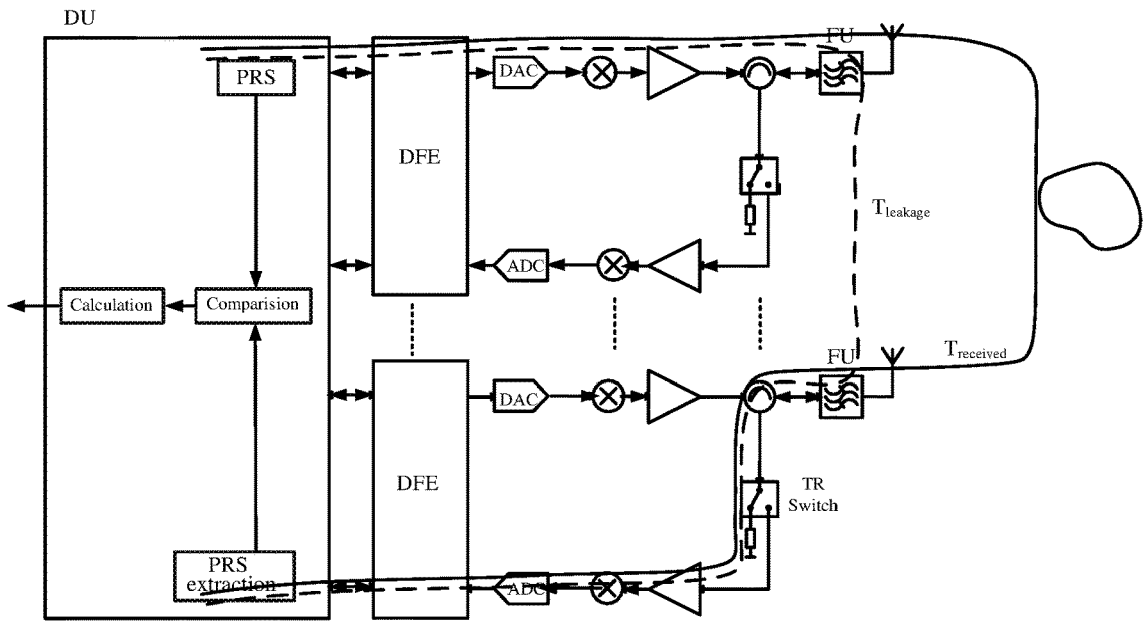
FIG. 7 shows an exemplary structure of a base station in which the method as shown in FIG. 6 may be implemented.

FIG. 7 shows an exemplary structure of a base station in which the method as shown in FIG. 6 may be implemented. The base station as shown may be applied to TDD operation. In FIG. 7, the PRS is generated in a digital unit (DU) and transmitted through one transceiver. The transmission leakage signal and the reflection signal of the PRS are received via another transceiver. Then in the digital unit, it is determined whether the obstacle exists by the comparison between the reflection signal and the threshold, and further the position information of the obstacle may be calculated. The distance between the base station and the obstacle may be calculated, for example, based on the difference between the time period $T_{leakage}$ during which the transmission leakage signal transmits from the transmitter to the receiver and the time period during $T_{received}$ which the PRS is transmitted from the transmitter and reflected by the obstacle to the receiver. The time period during which the PRS is transmitted from the transmitter to the obstacle $T_{distance}$ may be calculated as $(T_{received}-T_{leakage})/2$.

Figure 8:
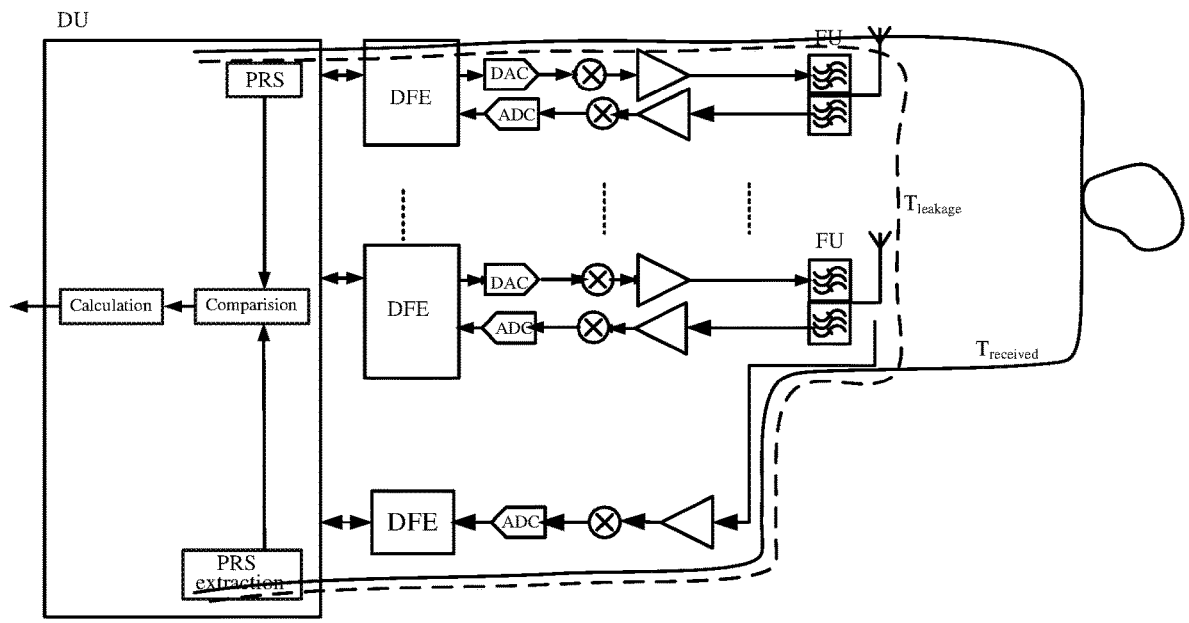
FIG. 8 shows another exemplary structure of a base station in which the method as shown in FIG. 6 may be implemented.

FIG. 8 shows another exemplary structure of a base station in which the method as shown in FIG. 6 may be implemented. This base station may be applied to FDD operation. In FDD, the transmitted downlink signal is on another frequency than the received uplink signal. Therefore the base station as shown in FIG. 8 may further comprise an antenna observation receiver in addition to the structure of FIG. 7. The antenna observation receiver is normally used for antenna calibration and to monitor a status of the antenna system. In FIG. 8, the transmission leakage signal and the reflection signal are received via the antenna observation receiver.

Figure 9:
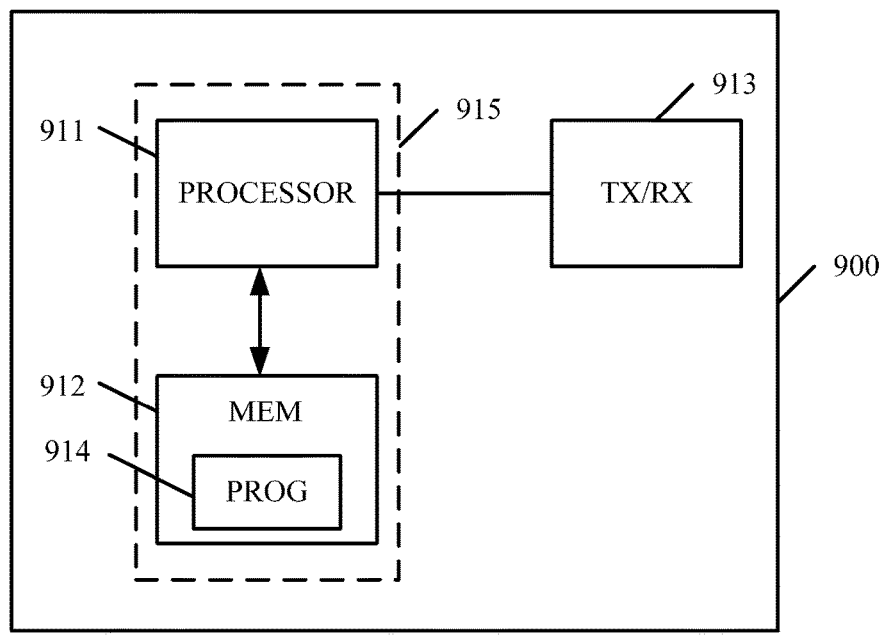
FIG. 9 illustrates a simplified block diagram of an apparatus in a base station according to an embodiment of the present disclosure.

Reference is now made to FIG. 9, which illustrates a simplified block diagram of an apparatus 900 that may be embodied in/as a base station. The base station may be, for example, a NB, an eNB or a gNB comprising a multi-antenna system, such as the base station as shown in FIG. 7 or FIG. 8.

The apparatus 900 may comprise at least one processor 911, such as a data processor (DP) and at least one memory (MEM) 912 coupled to the processor 911. The apparatus 900 may further comprise a plurality of transmitters TX and receivers RX 913 coupled to the processor 911. The MEM 912 stores a program (PROG) 914. The PROG 914 may include instructions that, when executed on the associated processor 911, enable the apparatus 900 to operate in accordance with the embodiments of the present disclosure, for example to perform the method 600. A combination of the at least one processor 911 and the at least one MEM 912 may form processing means 915 adapted to implement various embodiments of the present disclosure.

Various embodiments of the present disclosure may be implemented by computer program executable by one or more of the processor 911, software, firmware, hardware or in a combination thereof.

The MEM 912 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 911 may be of any type suitable to the local technical environment, and may include one or more of general purpose computers, special purpose computers, microprocessors, digital signal processors DSPs and processors based on multicore processor architecture, as non-limiting examples.

Figure 10:
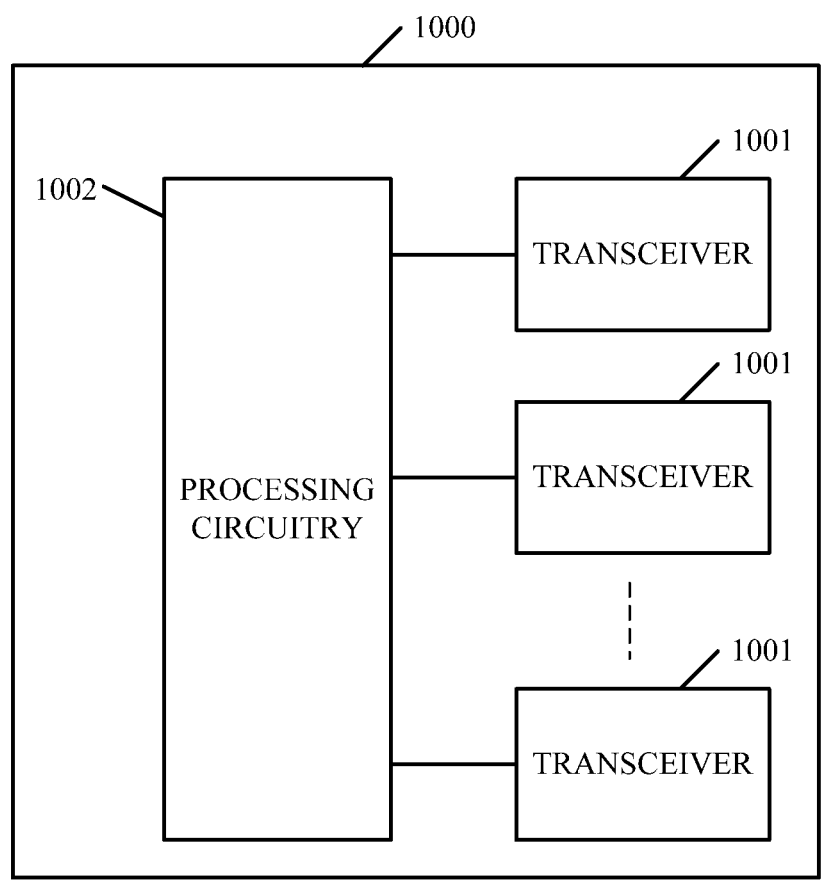
FIG. 10 illustrates a simplified block diagram of a base station according to an embodiment of the present disclosure.

Reference is now made to FIG. 10, which illustrates a simplified block diagram of a base station 1000. As shown in FIG. 10, the base station 1000 may comprise a plurality of transceivers 1001 and a processing circuitry 1002. The transceiver 1001 may be configured to transmit a positioning reference signal, and receive a transmission leakage signal and a reflection signal of the positioning reference signal. The processing circuitry 1002 may be configured to determine whether there exists an obstacle based on the reflection signal, and determine position information of the obstacle based on the transmission leakage signal and the reflection signal.

In some embodiments, the processing circuitry 1002 may be configured to measure a power level of the reflection signal, to compare the power level with a predefined threshold, and to determine, in response to the power level being higher than the predefined threshold, that there exists the obstacle. In an embodiment, the processing circuitry 1002 may be configured to determine that no obstacle exists if the power level is lower than the predefined threshold.

In some embodiments, the processing circuitry 1002 may be configured to determine a receipt time difference between the transmission leakage signal and the reflection signal, to calculate a distance between the base station and the obstacle based on the receipt time difference, and to estimate a direction of arrival of the reflection signal.

Figure 11:
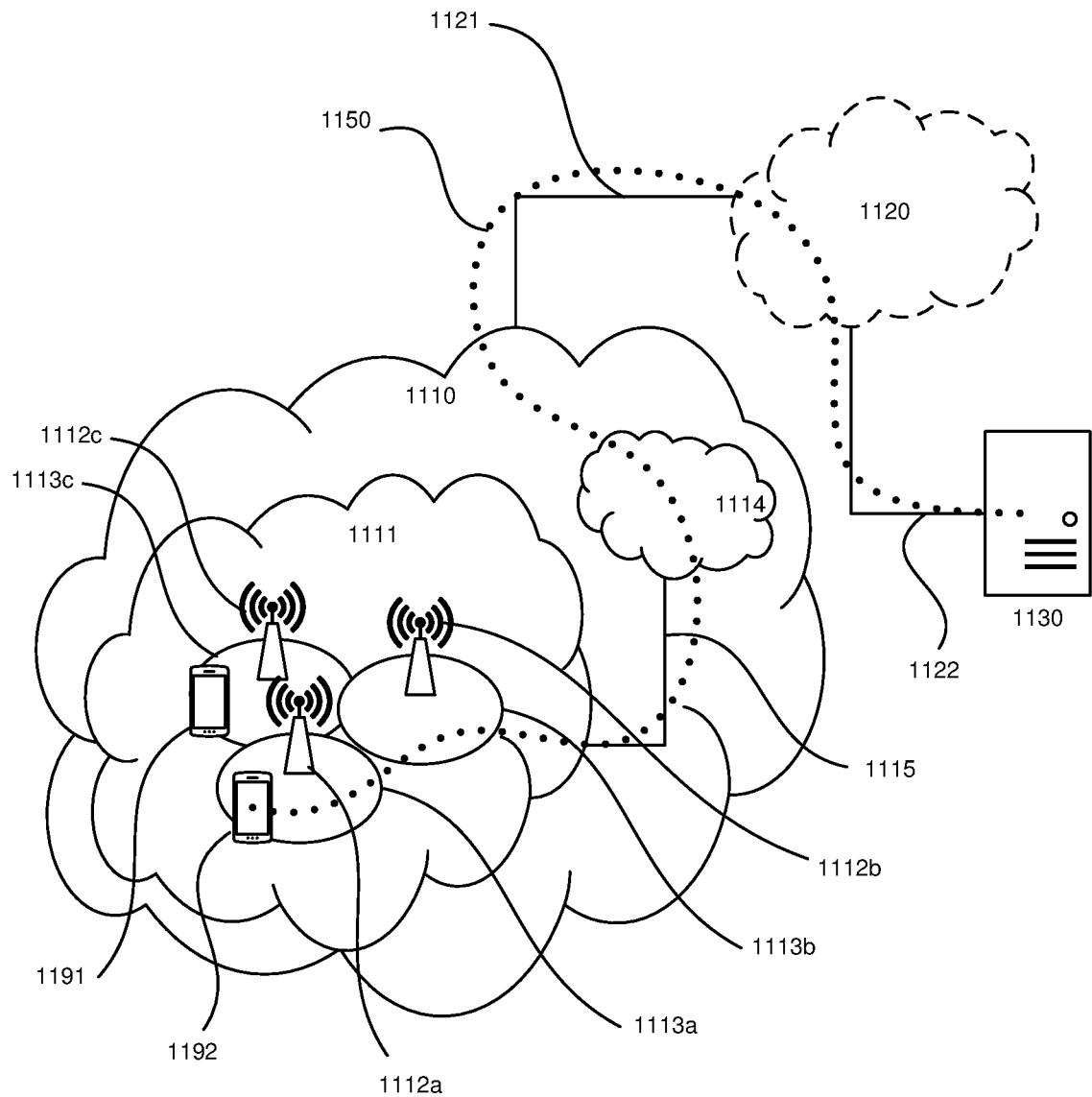
FIG. 11 illustrates a telecommunication network connected via an intermediate network to a host computer according to some embodiments of the present disclosure.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112*a*, 1112*b*, 1112*c*, such as NBs, eNBs, gNBs or other types of wireless access points, each defining a corresponding coverage area 1113*a*, 1113*b*, 1113*c*. Each base station 1112*a*, 1112*b*, 1112*c* is connectable to core network 1114 over a wired or wireless connection 1115. A first UE 1191 located in coverage area 1113*c* is configured to wirelessly connect to, or be paged by, the corresponding base station 1112*c*. A second UE 1192 in coverage area 1113*a* is wirelessly connectable to the corresponding base station 1112*a*. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

Figure 12:
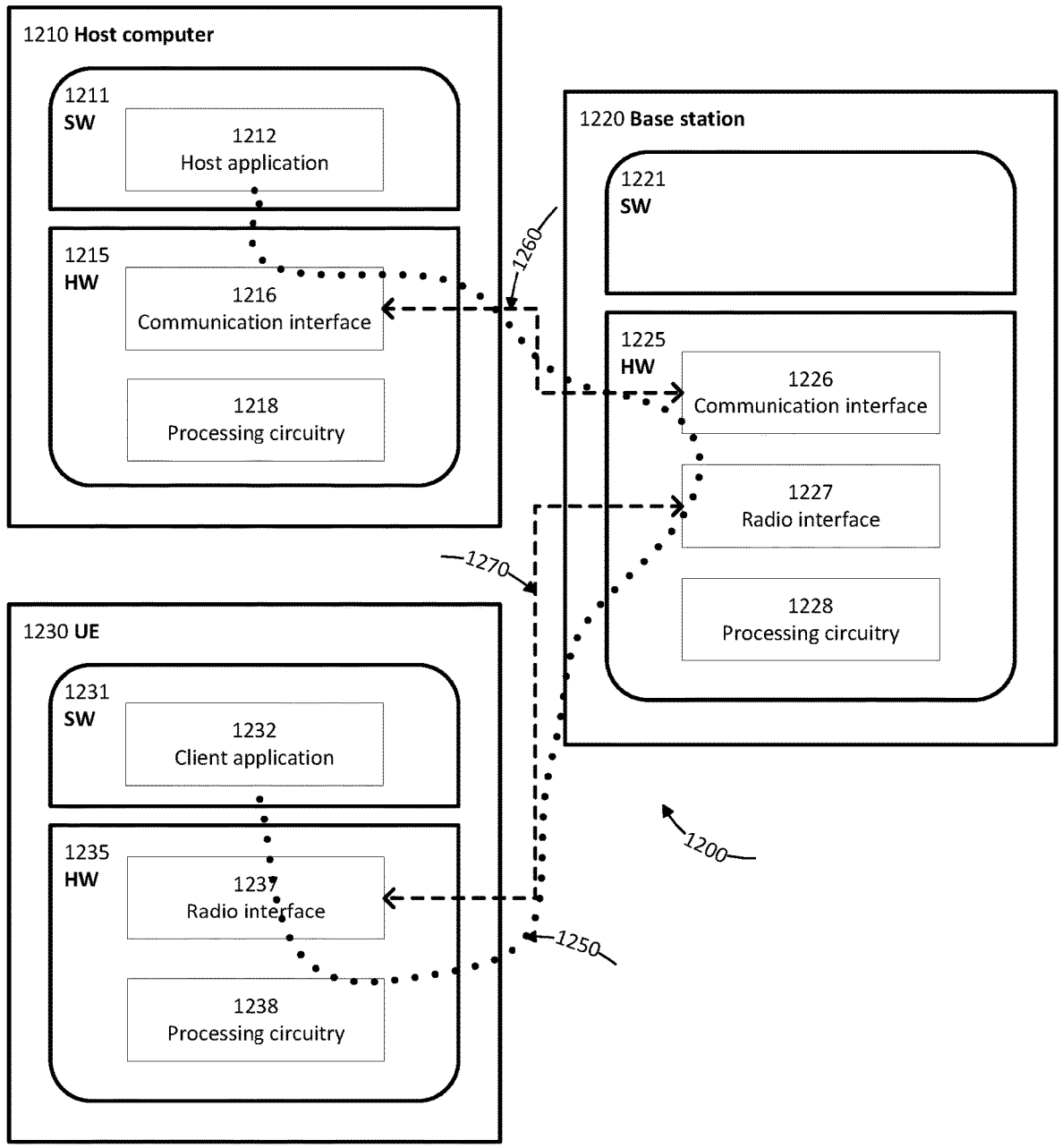
FIG. 12 illustrates a host computer communicating via a base station with a user equipment over a plurality of wireless connection according to some embodiments of the present disclosure.

It is noted that host computer 1210, base station 1220 and UE 1230 illustrated in FIG. 12 may be similar or identical to host computer 1130, one of base stations 1112*a*, 1112*b*, 1112*c* and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the antenna performance of the base station, and thereby provide benefits such as high signal transmission quality.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 13:
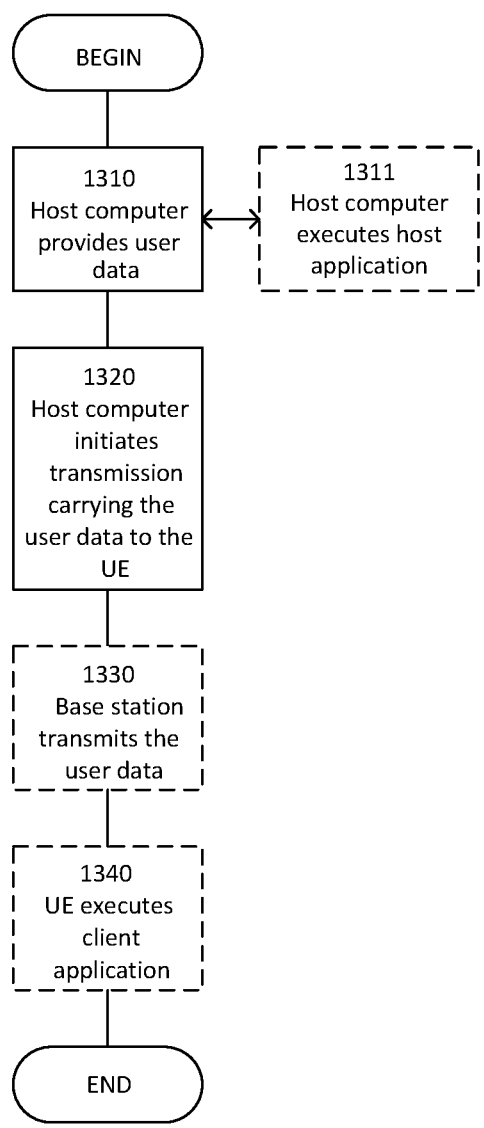
FIG. 13 illustrates a flowchart of methods in a communication system including a host computer, a base station and a user equipment according to some embodiments of the present disclosure.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In block 1310, the host computer provides user data. In sub-block 1311 (which may be optional) of block 1310, the host computer provides the user data by executing a host application. In block 1320, the host computer initiates a transmission carrying the user data to the UE. In block 1330 (which may be optional), the base station transmits to the UE the user data which was carried in the transmission that the host computer initiated, in accordance with the teachings of the embodiments described throughout this disclosure. In block 1340 (which may also be optional), the UE executes a client application associated with the host application executed by the host computer.

Figure 14:
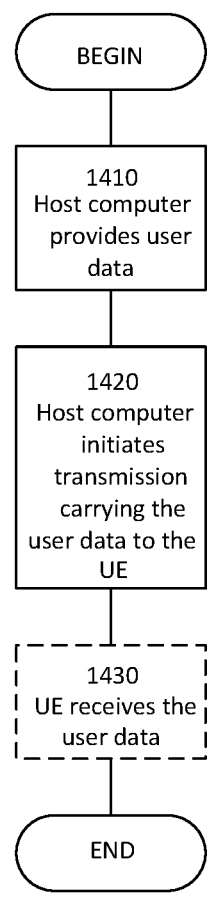
FIG. 14 illustrates a flowchart of methods in a communication system including a host computer, a base station and a user equipment according to some embodiments of the present disclosure.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In block 1410 of the method, the host computer provides user data. In an optional sub-block (not shown) the host computer provides the user data by executing a host application. In block 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
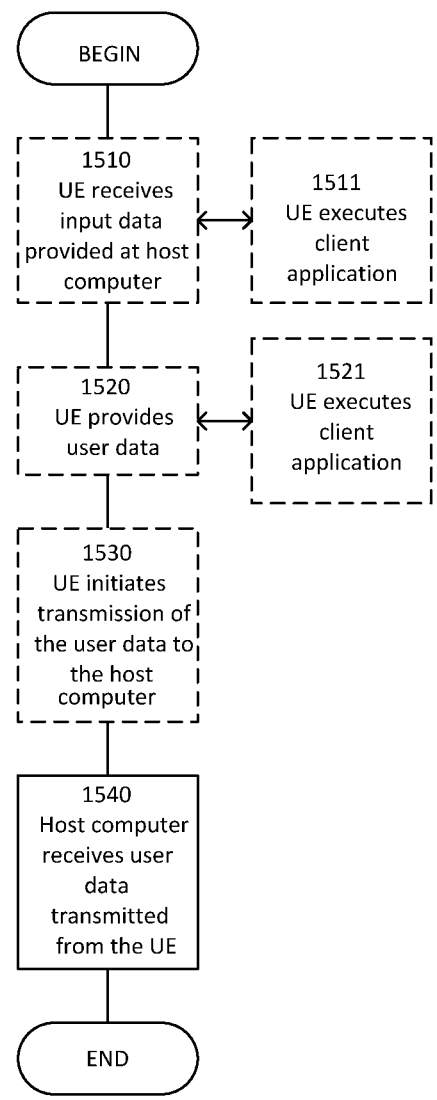
FIG. 15 illustrates a flowchart of methods in a communication system including a host computer, a base station and a user equipment according to some embodiments of the present disclosure.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In block 1510 (which may be optional), the UE receives input data provided by the host computer. Additionally or alternatively, in block 1520, the UE provides user data. In sub-block 1521 (which may be optional) of block 1520, the UE provides the user data by executing a client application. In sub-block 1511 (which may be optional) of block 1510, the UE executes a client application which provides the user data in reaction to the received input data provided by the host computer. In providing the user data, the executed client application may further consider user input received from the user. Regardless of the specific manner in which the user data was provided, the UE initiates, in sub-block 1530 (which may be optional), transmission of the user data to the host computer. In block 1540 of the method, the host computer receives the user data transmitted from the UE, in accordance with the teachings of the embodiments described throughout this disclosure.

Figure 16:
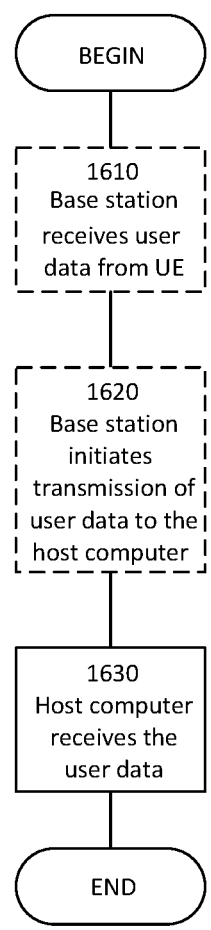
FIG. 16 illustrates a flowchart of methods in a communication system including a host computer, a base station and a user equipment according to some embodiments of the present disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In block 1610 (which may be optional), in accordance with the teachings of the embodiments described throughout this disclosure, the base station receives user data from the UE. In block 1620 (which may be optional), the base station initiates transmission of the received user data to the host computer. In block 1630 (which may be optional), the host computer receives the user data carried in the transmission initiated by the base station.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a base station, comprising:
   transmitting a positioning reference signal;
   receiving a transmission leakage signal and a reflection signal of the positioning reference signal;
   determining whether there exists an obstacle based on the reflection signal, determining whether there exists an obstacle based on the reflection signal comprising:
   measuring a power level of the reflection signal;
   comparing the power level with a predefined threshold; and
   determining, in response to the power level being higher than the predefined threshold, that there exists the obstacle; and
   determining position information of the obstacle based on the transmission leakage signal and the reflection signal.

2. The method according to claim 1, wherein determining position information of the obstacle based on the transmission leakage signal and the reflection signal comprises:
   determining a receipt time difference between the transmission leakage signal and the reflection signal;
   calculating a distance between the base station and the obstacle based on the receipt time difference; and
   estimating a direction of arrival of the reflection signal.

3. The method according to claim 1, wherein determining position information of the obstacle based on the transmission leakage signal and the reflection signal comprises:
   determining a receipt time difference between the transmission leakage signal and the reflection signal;
   calculating a distance between the base station and the obstacle based on the receipt time difference; and
   estimating a direction of arrival of the reflection signal.

4. An apparatus in a base station, the apparatus comprising:
   a processor; and
   a memory coupled to the processor, said memory containing instructions executable by the processor to configure the apparatus to:
   transmit a positioning reference signal;
   receive a transmission leakage signal and a reflection signal of the positioning reference signal;
   determine whether there exists an obstacle based on the reflection signal;
   determine position information of the obstacle based on the transmission leakage signal and the reflection signal;
   determine a receipt time difference between the transmission leakage signal and the reflection signal;
   calculate a distance between the base station and the obstacle based on the receipt time difference; and estimate a direction of arrival of the reflection signal.

5. The apparatus according to claim 4, wherein the apparatus is operative configured to:
   measure a power level of the reflection signal;
   compare the power level with a predefined threshold; and
   determine, in response to the power level being higher than the predefined threshold, that there exists the obstacle.

6. The apparatus according to claim 5, wherein the apparatus is configured to:
   determine a receipt time difference between the transmission leakage signal and the reflection signal;
   calculate a distance between the base station and the obstacle based on the receipt time difference; and
   estimate a direction of arrival of the reflection signal.

7. A base station comprising:
   a plurality of transceivers configured to transmit a positioning reference signal, and receive a transmission leakage signal and a reflection signal of the positioning reference signal; and
   a processing circuitry configured to determine whether there exists an obstacle based on the reflection signal by measuring a power level of the reflection signal, comparing the power level with a predefined threshold, and determining, in response to the power level being higher than the predefined threshold, and determine position information of the obstacle based on the transmission leakage signal and the reflection signal.

8. The base station according to claim 7, wherein the processing circuitry is configured to: determine a receipt time difference between the transmission leakage signal and the reflection signal, calculate a distance between the base station and the obstacle based on the receipt time difference, and estimate a direction of arrival of the reflection signal.

9. The base station according to claim 7, wherein the processing circuitry is configured to: determine a receipt time difference between the transmission leakage signal and the reflection signal, calculate a distance between the base station and the obstacle based on the receipt time difference, and estimate a direction of arrival of the reflection signal.

* * * * *